(12) United States Patent
Walters (10) Patent No.: US 6,566,830 B2
(45) Date of Patent: May 20, 2003

(54) METHOD AND SYSTEM FOR CONTROLLING A PERMANENT MAGNET MACHINE

(75) Inventor: James E. Walters, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 6 days.

(21) Appl. No.: 09/932,602

(22) Filed: Aug. 17, 2001

(65) Prior Publication Data

US 2003/0034751 A1 Feb. 20, 2003

(51) Int. Cl.[7] .............................. H02P 1/00; H02P 1/04; H02P 1/46; H02P 5/28
(52) U.S. Cl. ...................... 318/445; 318/431; 318/720; 318/799
(58) Field of Search ................................. 318/430, 431, 318/437, 445, 466, 467, 468, 700, 705, 720, 721, 254, 439, 799–815, 778; 187/290–299

(56) References Cited

U.S. PATENT DOCUMENTS

| 3,909,688 A | * | 9/1975 | Blaschke et al. | ........... 318/700 |
| 5,537,020 A | * | 7/1996 | Couture et al. | ............. 318/720 |
| 5,572,097 A | * | 11/1996 | Cameron | ................... 318/254 |
| 5,734,135 A | * | 3/1998 | Hakala et al. | ............... 187/292 |
| 5,751,125 A | * | 5/1998 | Weiss | .......................... 318/280 |
| 5,841,252 A | * | 11/1998 | Dunfield | ....................... 318/254 |
| 6,072,288 A | * | 6/2000 | Izumisawa et al. | ......... 318/254 |
| 6,252,367 B1 | * | 6/2001 | Sakamoto et al. | .......... 318/560 |

* cited by examiner

Primary Examiner—Robert E. Nappi
Assistant Examiner—Patrick Miller
(74) Attorney, Agent, or Firm—Margaret A. Dobrowitsky (57) ABSTRACT

Method and system for controlling the start of a permanent magnet machine are provided. The method allows to assign a parameter value indicative of an estimated initial rotor position of the machine. The method further allows to energize the machine with a level of current being sufficiently high to start rotor motion in a desired direction in the event the initial rotor position estimate is sufficiently close to the actual rotor position of the machine. A sensing action allows to sense whether any incremental changes in rotor position occur in response to the energizing action. In the event no changes in rotor position are sensed, the method allows to incrementally adjust the estimated rotor position by a first set of angular values until changes in rotor position are sensed. In the event changes in rotor position are sensed, the method allows to provide a rotor alignment signal as rotor motion continues. The alignment signal allows to align the estimated rotor position relative to the actual rotor position. This alignment action allows for operating the machine over a wide speed range.

16 Claims, 4 Drawing Sheets

METHOD AND SYSTEM FOR CONTROLLING A PERMANENT MAGNET MACHINE

This invention was made with U.S. Government support through Definitized Subcontract C-HEV-5A under MRI/CHRYSLER Subcontract No. ZAN-6-16334-01 under PRIME CONTRACT NO. DE-AC36-83CH10093 awarded by the Department of Energy, and in accordance with the terms set forth in said contracts, the U.S. Government may have certain rights in the invention.

BACKGROUND OF THE INVENTION

The present invention is generally related to control of electromechanical machines, and, more particularly, the present invention is related to method and system for controlling a permanent magnet (PM) machine without using high resolution absolute rotor position.

In the starting and control of permanent magnet machines using sinusoidal current control, the absolute position of the rotor of the machine is generally required to appropriately position the stator's current vector relative to the rotor's magnet flux vector in order for the machine to develop a desired level of torque.

It is known that various techniques have been proposed to determine absolute rotor position. Some of the proposed techniques require the use of resolver devices. Although resolver devices can accurately determine the absolute position of the rotor, such devices generally require tight positional tolerances and associated driving circuitry, and thus their relatively high cost incrementally adds to the overall cost of a propulsion system that uses permanent magnet machines.

Other techniques have attempted to determine the absolute position of the rotor without the use of sensors. Unfortunately, sensorless techniques may require computationally intensive algorithms and may not be suitable to applications, such as those using flywheel alternator starter systems, where a relatively high initial torque is desired so that, for example, an internal combustion engine coupled to the starter system can be started as quickly as possible under extreme environmental conditions.

Unfortunately, absolute position sensors based on standard position-pulse techniques have limitations since such sensors may not be effectively utilized for applications that require high initial starting torque since the absolute position is not determined until a pulse indicative of relative position of the rotor is received by a controller. For example, the rotor position determination may not occur for up to about one mechanical revolution of the rotor, during which the controller would be unable to appropriately position the current vector relative to the flux vector. This condition could lead either to reduced torque generation or even to negative torque generation.

Figure 1:
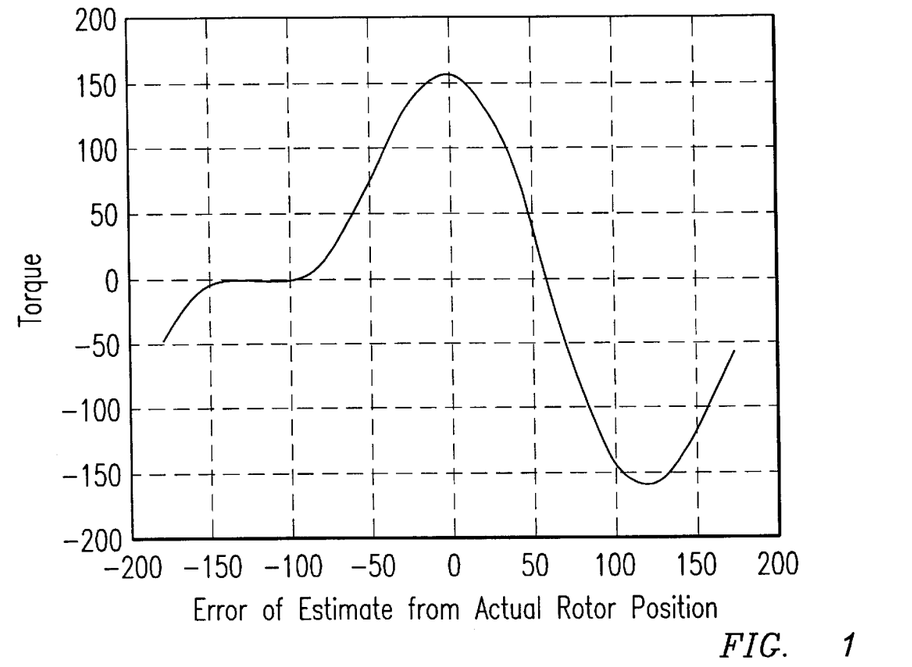
FIG. 1 illustrates an exemplary plot of torque production of a PM machine as a function of angular position error.

In view of the foregoing issues, it is desirable to provide techniques capable of producing high initial starting torque without having to use a high resolution absolute position sensor. For example, the assignee of the present invention has proposed to use a low-cost and reliable sensing scheme that allows the machine to seamlessly transition from a brushless direct current (DC) mode of operation to an alternating current (AC) mode of operation. See attorney docket No. DP-304,528 for a detailed description of such scheme. The present invention proposes to take advantage of certain physical properties of PM machines. For example, it is known that torque production in a PM machine is due to two unique physical properties. The first property is based on current/flux interaction and the second property is based on reluctance principles. Thus, it will be appreciated that the torque characteristics of a PM machine will be a function of both current magnitude and phase relative to the position of the rotor of the machine. An example of this torque characteristic is shown in FIG. 1. It will be observed from FIG. 1 that the level of torque can vary significantly even over a relatively narrow angular range, e.g., a 60-degree range, of rotor position misalignment relative to the rotor position corresponding to the peak torque of the machine. It will be further observed from FIG. 1 that the peak torque value is relatively insensitive to small angular changes (e.g., +/−10 degrees) about the rotor position corresponding to that torque value.

The present invention proposes cost-efficient and reliable techniques that sense how the machine reacts to an initial estimate of rotor position. If for a given rotor position estimation the rotor turns, then that estimate of rotor position is likely to be sufficiently close relative to the actual rotor position corresponding to the peak torque of the machine. Conversely, if the rotor does not turn, then a processor could be used to perform an algorithm for incrementally adjusting the estimated rotor position through several other positions until sufficient torque is achieved to overcome the frictional and compressive forces of the internal combustion engine coupled to the starter system. It would be desired that such an algorithm be able to quickly start the machine while ensuring the ability to generate full torque. The level of the incremental adjustments of estimated rotor position can be customized, e.g., step wise, to the torque characteristics of the machine to optimize the foregoing objectives. That is, being able to quickly generate a high level of torque sufficient to start the machine in a desired direction. It would be further desirable to ensure that rotation of the rotor does not stall prior to processing a signal that allows to substantially align the estimated rotor position relative to the actual rotor position of the machine. In view of the foregoing discussion, it would be desirable to be able to start and control a PM machine without resorting to complex control algorithms, expensive sensors or without having to perform burdensome hardware modifications to the machine.

BRIEF SUMMARY OF THE INVENTION

Generally, the present invention fulfills the foregoing needs by providing in one aspect thereof a method for controlling the start of a permanent magnet machine. The method allows to assign a parameter value indicative of an estimated initial rotor position of the machine. The method further allows to energize the machine with a level of current being sufficiently high to start rotor motion in a desired direction in the event the initial rotor position estimate is sufficiently close to the actual rotor position of the machine. A sensing action allows to sense whether any incremental changes in rotor position occurs in response to the energizing action. In the event no changes in rotor position are sensed, the method allows to incrementally adjust the estimated rotor position by a first set of angular values until changes in rotor position are sensed. In the event changes in rotor position are sensed, the method allows to provide a rotor alignment signal as rotor motion continues. The alignment signal allows to align the estimated rotor position relative to the actual rotor position.

The present invention further fulfills the foregoing needs by providing in another aspect thereof, a system for controlling the start of a permanent magnet machine. The system includes a parameter-assignment module configured to assign a parameter value indicative of an estimated initial rotor position of the machine. An energization module is configured to energize the machine with a level of current being sufficiently high to start rotor motion in a desired direction in the event the initial rotor position estimate is sufficiently close to the actual rotor position of the machine. A sensor is configured to sense whether any incremental changes in rotor position occurs in response to the energizing current. A processor is coupled to the incremental sensor to implement the following actions:

in the event no changes in rotor position are sensed, incrementally adjusting the estimated rotor position by a first set of angular values until changes in rotor position are sensed;

in the event changes in rotor position are sensed, processing a rotor alignment signal as rotor motion continues; and aligning the estimated rotor position relative to the actual rotor position based on the alignment signal.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 2:
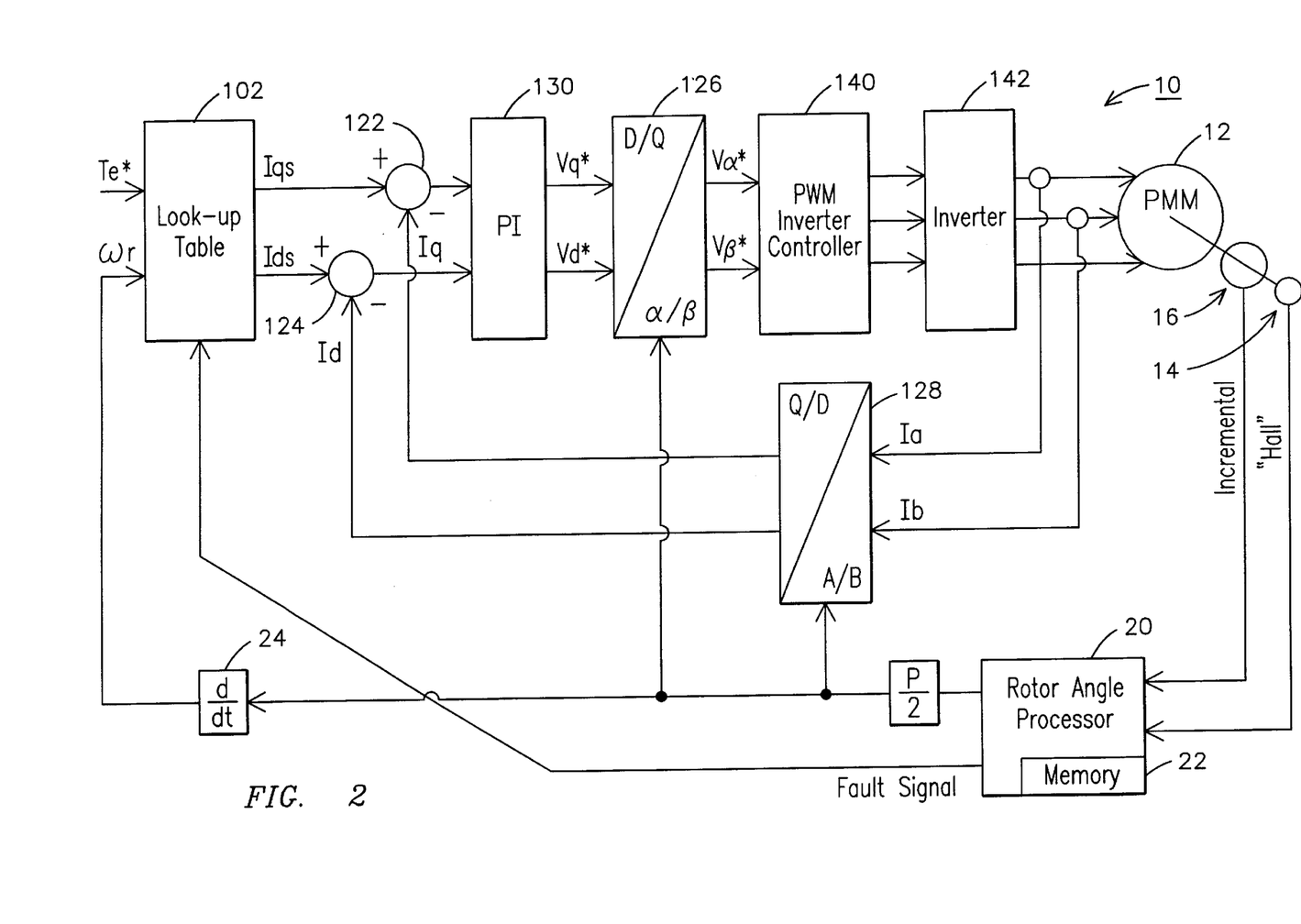
FIG. 2 illustrates a block diagram schematic of an exemplary propulsion system including a processor in accordance with one aspect of the present invention.

FIG. 2 shows a block diagram representation of a system 10 embodying aspects of the present invention for controlling a permanent magnet machine (12). As shown in FIG. 2, system 10 includes a sensor assembly 14 for sensing rotor sector position relative to a plurality of angular sectors. In one exemplary embodiment, sensor assembly 14 comprises one or more sensors. Examples of sensors that may be used for sensing rotor sector position include Hall-effect sensors, magneto-resistive sensors and optical sensors. Assuming a circumferential arrangement wherein three sensors are spaced about 120 electrical degrees from one another, then one can define a plurality of six angular sectors, each encompassing about 60 electrical degrees. During start up of the machine, the initial rotor position would be known to a resolution of +/−30 electrical degrees. That is, sensor assembly 14 allows to determine the position of the rotor in any respective one of the six angular sectors. As suggested above, it will be appreciated that sensor assembly 14 is not limited to three sensors since the techniques of the present invention can be utilized with any desired number of sensors. In fact, as further described below, the techniques of the present invention need not use any sensor assembly 14 for assigning a parameter value indicative of an estimated initial rotor position of the machine. Another exemplary arrangement for sensor assembly 14 may provide an arrangement using two sensors. In this arrangement, one can define a plurality of four angular sectors, each encompassing about 90 electrical degrees. During start up of the machine, the initial rotor position would be known to a resolution of +/−45 electrical degrees. That is, in this arrangement sensor assembly 14 would allow to determine the position of the rotor in any respective one of the four angular sectors. Still another exemplary arrangement for sensor assembly 14 may provide a single sensor. Assuming such single sensor arrangement, then one can define a plurality of two angular sectors, each encompassing about 180 electrical degrees. During start up of the machine, the initial rotor position would be known to a resolution of +/−90 electrical degrees. That is, in this arrangement sensor assembly 14 would allow to determine the position of the rotor in any respective one of the two angular sectors. The selection of the specific number of sensors to use in a given application may be based on cost/benefit considerations, such as desired cost versus allowable start time in the given application.

FIG. 2 further shows a sensor 16 for sensing angular increments in rotor position. For example, a stream of pulses may be accumulated in a suitable counter to determine changes in rotor position information. Although FIG. 2 shows the incremental sensor 16 as separate from sensor assembly 14, it will be appreciated that sensor assembly 14 and incremental sensor 16 could be integrated in a common sensor package. The rotor sector position from sensor assembly 14 is supplied to a processor 20 configured to perform at least one of the algorithms illustrated in FIGS. 3 and 4 in order to calculate rotor position information, which is passed to respective voltage and current transformation units 126 and 128 to control operation of the machine.

Figure 3:
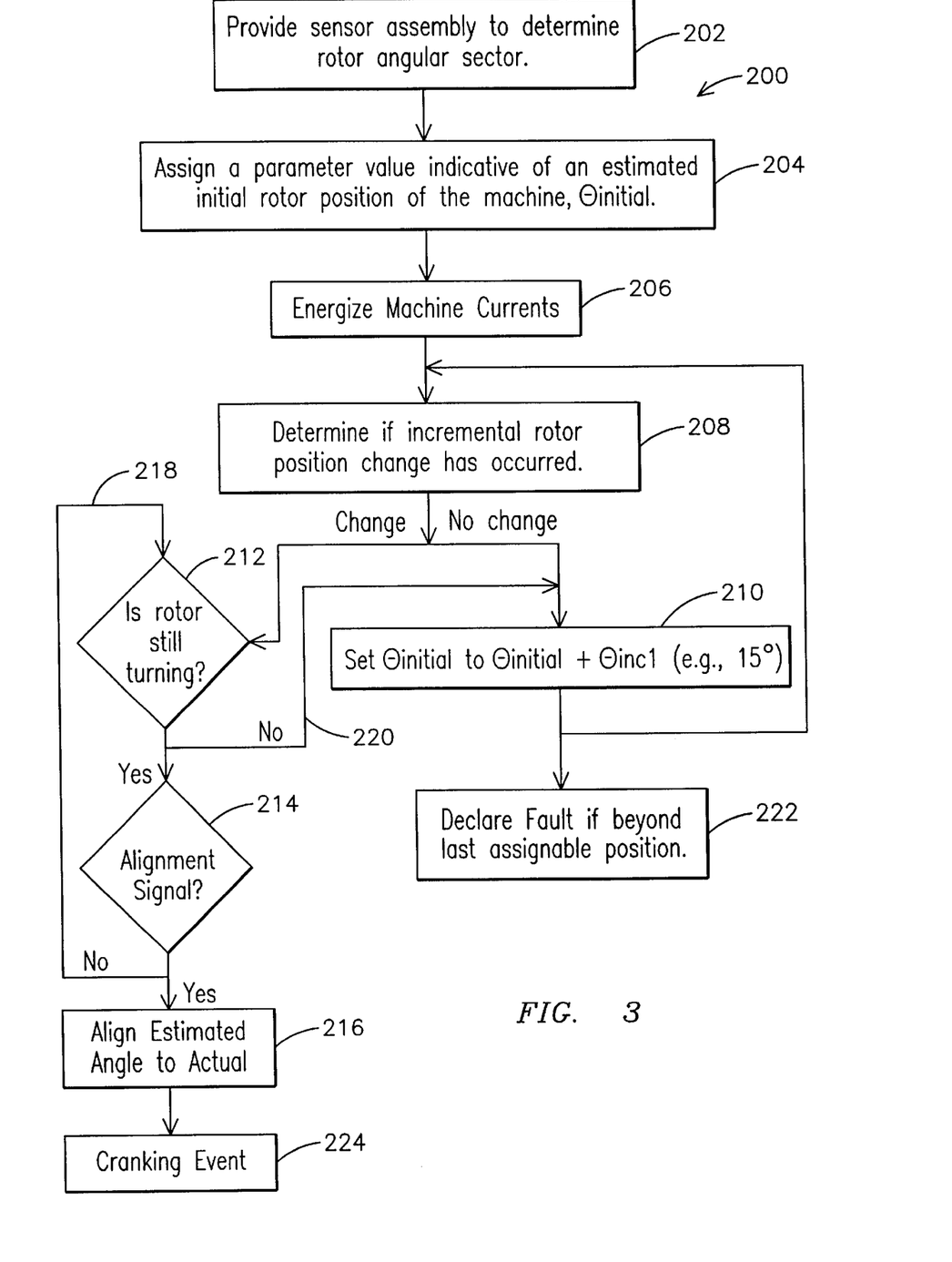
FIGS. 3 and 4 illustrate respective algorithms that may be executed in conjunction with the processor of FIG. 2 for controlling start of a PM machine in the absence of a high resolution absolute rotor position sensor.

FIG. 3 illustrates a flow chart of an algorithm 200 that allows to start the PM machine by using rotor angular sector information. At block 202, algorithm 200 provides a sensor assembly, e.g., sensor assembly 14 (FIG. 2), to determine a respective angular sector information of the rotor. At block 204, a parameter value indicative of an estimated initial rotor position ($\theta_{init}$) is assigned. For example, assuming that sensor assembly 14 comprises three sensors, and further assuming that the initial angular sector for the rotor comprises a sector from zero to sixty electrical degrees. Then, one could assign an intermediate angle (e.g., 30 degrees) relative to the edges of the angular sector as the estimated initial rotor position ($\theta_{init}$). In the alternative, one could assign one of the edges of the angular sector (e.g., zero or sixty degrees) as the estimated initial rotor position ($\theta_{init}$). Assuming zero degrees is the estimated initial rotor position, then one would use positive increments to reach other rotor position estimates in that angular sector. Conversely, assuming 60 degrees is the estimated initial rotor position, then one would use negative increments to reach other rotor position estimates in that same angular sector. If the intermediate angle is the estimated initial rotor position, then one may have to vary the magnitude and polarity of the increments to ensure appropriate estimations of the rotor position. For example, the first increment may be a positive increment of 15 degrees relative to the initial rotor angle position of 30 degrees. This increment would correspond to a rotor angle position of 45 electrical degrees. Assuming no incremental changes in rotor position are sensed, the next angular increment may be −30 degrees. This increment would correspond to a rotor angle position of 15 electrical degrees, etc. Block 206 allows to energize the machine with a level of current being sufficiently high to start rotor motion in a desired direction in the event the initial rotor position estimation is sufficiently close to the actual rotor position of the machine. Block 208, using, for example, incremental sensor 16 (FIG. 2) allows to sense whether any incremental changes in rotor position occur in response to the energizing action 206. In the event no changes in rotor position are sensed, block 210 allows to incrementally adjust the estimated rotor position by a first set of angular values (e.g., 15 degrees or other relatively small value that would allow to detect a rotor angle proximate to the peak torque of the machine) until changes in rotor position are sensed. As suggested above, it will be understood that the magnitude and/or the polarity of the increments may vary depending on the particular initial estimate of the rotor angle. It will be further understood that such set of angular values may be comprised of a single value. As shown at blocks 212 and 214, in the event changes in rotor position are sensed, a rotor alignment signal is provided as rotor motion continues. As will be appreciated by those skilled in the art, the rotor alignment signal may be provided from various sources. For example, it may be provided from sensor assembly 14 (FIG. 2) as the sensor assembly senses a transition from one angular sector to an adjacent sector, or it could be provided from various sensors commonly available in internal combustion engine applications, such as cam sensors, crank sensors, sensing wheel with a missing tooth, etc. In one exemplary embodiment, a relatively small time delay is provided before repeating a check on incremental changes in rotor position. Block 216 allows to align the estimated rotor position relative to the actual rotor position based on the alignment signal. This alignment action allows for operating the machine over a wide speed range. If a stall condition were to develop, as may be determined if the alignment signal is not provided, or essentially no incremental changes in rotor angle position are sensed, then looping actions 218 and 220, allow to loop back to block 210 so that new rotor angle positions may be estimated. If all available positions are tried in the angular sector, (e.g., four positions assuming increments of 15 degrees, and a sector of 60 degrees), and no rotor movement is sensed, then a fault signal may be declared at 222. Conversely, if no stall condition develops, then the algorithm can proceed to start a cranking event, as shown at 224.

Figure 4:
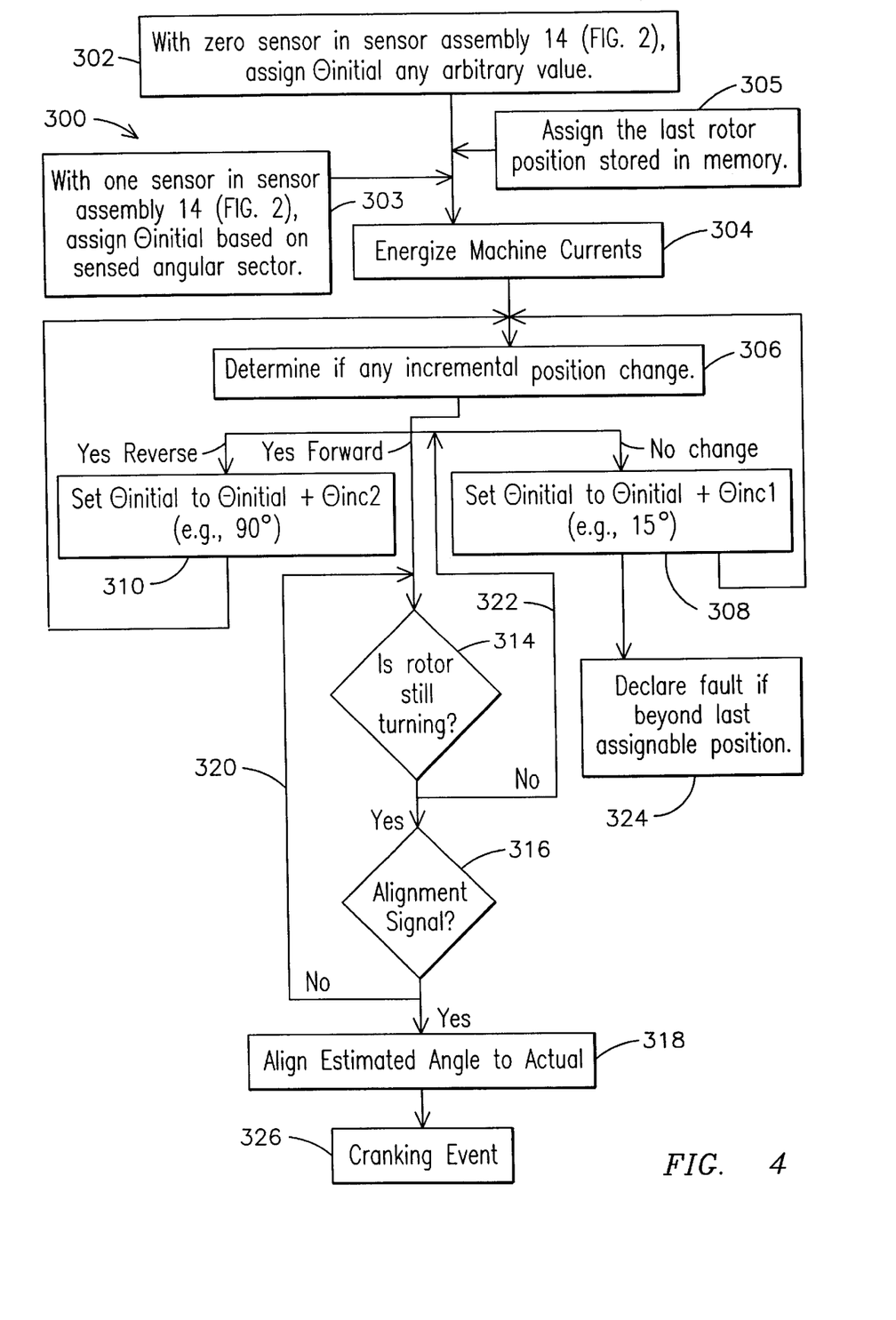

FIG. 4 illustrates a flow chart of an algorithm 300 that allows to start the PM machine by using rotor position information derived either sensorlessly or with a single sensor in sensor assembly 14 (FIG. 2). Algorithm 300 allows for removing uncertainty that could occur relative to the polarity for the rotation of the rotor. In one exemplary embodiment, as shown at block 302, assuming a sensorless embodiment, a parameter value indicative of an estimated initial rotor position ($\theta_{init}$) is assigned. A memory 22 (FIG. 2) may be used for storing an arbitrary initial rotor angle position. For example, zero degrees or any other arbitrary angle from zero to 360 electrical degrees. As represented at block 305, in some applications, memory 22 may be configured to store the last rotor position angle computed for the machine prior to the present start of the machine. In this case, assuming the rotor position has not changed, the value retrieved from memory 22 should closely correspond to the actual rotor position of the machine. It will be appreciated, however, that when operating sensorlessly there is a possibility that the last stored value may be somewhat inaccurate due to various factors, such as degradation in the accuracy of rotor position during rotor deceleration prior to stoppage of the vehicle, or movement of the vehicle while in gear. In another exemplary embodiment, as shown at block 303, assuming a single sensor is used, the initial rotor angle position may correspond to one of the edges of the angular sector detected. Assuming the angular sector extends from zero to 180 degrees, one could assign an initial estimate of zero degrees and then adjust the initial estimate with positive angular increments. Conversely, one could assign an initial estimate of 180 degrees, and then adjust the initial estimate with negative angular increments. Block 304 allows to energize the machine with a level of current being sufficiently high to start rotor motion in a desired direction in the event the initial rotor position estimation is sufficiently close to the actual rotor position of the machine, Block 306 allows to sense whether any incremental changes in rotor position occur in response to the energizing action 304. In the event no changes in rotor position are sensed, block 308 allows to incrementally adjust the estimated rotor position by a predefined first angular value (e.g., 15 degrees or other relatively small value that would allow to detect a rotor position proximate to the peak torque of the machine) until changes in rotor position are sensed. As suggested above, since either no sensor assembly 14 (FIG. 2) is provided or only one sensor is provided in that assembly, algorithm 300 may require a sensor, such as a quadrature incremental sensor, for determining the direction of rotation of the rotor. As shown at block 310, in the event rotor position changes occur opposite to the desired direction of rotation, the incrementally adjusting action comprises incrementally adjusting the estimated rotor position by a second set of angular values until changes in rotor position in the desired direction are sensed. In one exemplary embodiment, the value of the second set of angular values may comprise about 90 electrical degrees. It will be appreciated, however, that other angular values having a sufficiently high value to quickly reach polarity reversal of the estimated rotor position relative to the actual rotor position could be used. As shown at blocks 314 and 316, in the event changes in rotor position in the desired direction are sensed, a rotor alignment signal is provided as the rotor motion continues. Block 318 allows to align the estimated rotor position relative to the actual rotor position based on the alignment signal. As suggested above, if a stall condition were to develop, as may be inferred if the alignment signal is not provided, or essentially no incremental changes in rotor angle position are sensed, then looping actions 320 and 322, allow to loop back to block 310 so that new rotor positions may be estimated. If all assignable rotor positions are tried, and no rotor movement is sensed, then a fault indication signal may be issued at 324. Conversely, if no stall condition develops, then the algorithm can proceed to start a cranking event, as shown at 326.

Returning to FIG. 2, the direct (d) axis current reference ($I_{ds}$) and the quadrature (q) axis current reference ($I_{qs}$) may be adjusted as a function of commanded torque $T_e^*$ and rotor speed $\omega_r$ using analytically and/or experimentally derived flux-adjusting values stored in a look-up table 102 that may comprise a two-dimensional look-up table responsive to two respective inputs to supply two outputs. Using techniques well-known to those skilled in the art, look-up table 102 may be configured to provide optimum efficiency control for an ideal case by adjusting the value of the d axis current reference ($I_{ds}$) and the q axis current reference ($I_{qs}$) as a function of commanded torque $T_e^*$ and rotor speed Ör. The value of the torque reference signal $T_e^*$ may be externally-derived by a system master controller or may correspond to the torque value commanded by an operator through a suitable machine propulsion throttle handle. The value of the rotor speed signal $\omega_r$ may be derived from the rotor angle value supplied by processor 20, upon execution of a mathematical differentiation operation by a suitable differentiator 24.

The d axis current reference, (I$_{ds}$) and a feedback current signal Id is each respectively applied to a subtractor 124 to generate a difference output signal. It will be understood that the subtracting operation respectively executed by subtractor 124 and other such devices described below may be executed by a summer having one inverting input terminal and one non-inverting input terminal. It will be further understood that any of the various arithmetic and logical operations performed in system 10 may be conducted through respective software modules as may be executed in a suitable microprocessor and such operations need not be executed through hardware modules. It will be appreciated that the difference output signal from subtractor 124 represents an error signal between the d axis current reference signal (Ids) and the feedback current signal Id. Similarly, the torque-producing current component reference Iqs is processed by a subtractor 122 that receives a feedback current Iq. In this case, the difference output signal from subtractor 122 represents an error signal between the torque current component reference signal Iqs and the feedback current signal Iq.

By way of example and not of limitation, a standard vector controller may comprise components such as respective voltage and current transformation units 126 and 128, and a proportional plus integral (PI) current regulator 130, each such component using techniques well-understood by those skilled in the art. For readers who desire further background regarding vector control techniques, reference is made to Chapters 5 and 6 of a textbook by D. W. Novotny and T. A. Lipo, titled "Vector Control and Dynamics of AC Drives", published by Oxford University Press, 1996, which textbook is herein incorporated by reference. Current transformation unit 128 converts the three-phase currents in the stationary frame into equivalent two-phase orthogonal currents in the rotor frame. After the transformation is performed, the two orthogonal current signals I$_q$ and I$_d$ in the rotor frame are respectively applied to the PI current regulator 130 as current feedback signals through subtractors 124 and 122. The output signals from the PI current regulator are then provided to voltage transformation unit 126 and are converted into equivalent two-phase voltage references in the stationary frame. Each respective output signal of voltage transformation unit 126 is then applied to a PWM inverter controller 140 that in one exemplary embodiment may comprise an over-modulation space vector PWM unit to generate three respective duty cycle values. It will be appreciated that the controller functionality is analogous to having six synchronous timers for respectively generating six-gate pulse signals to the respective gate drive circuits of an inverter 142 that energizes the phases of the permanent magnet machine 12. It will be further appreciated that the inverter's legs will be appropriately switched on and off according to the voltage levels of the gate signals from the controller in order to control operation of the permanent magnet machine.

Figure 5:
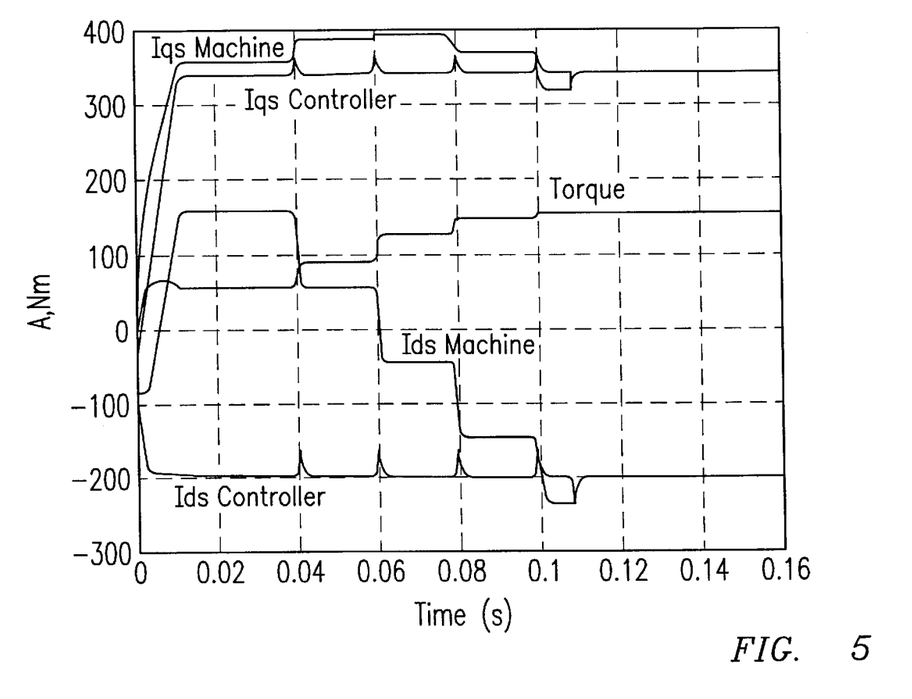
FIG. 5 illustrates exemplary simulated signal plots of machine currents, current commands, and torque each plotted as a function of time.

FIG. 5 illustrates exemplary simulated signal plots of quadrature machine currents, quadrature current commands, and generated torque. Each signal is plotted as a function of time. It will be observed in FIG. 5, that the initial rotor position, including an error of about 24.2 degrees, results in a torque of about 75 Nm, compared to a possible peak torque of 150 Nm. Starting at about 0.04 s, one will observe step-wise increases in torque as the rotor angle position is incremented in accordance with aspects of the present invention. At about 0.08 s, one will observe that the level of torque has increased in excess of 150 Nm, which would allow to overcome a stiction torque of 150 Nm and would result in a successful cranking event.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for controlling the start of a permanent magnet machine, said method comprising:

assigning a parameter value indicative of an estimated initial rotor position of the machine wherein the assigned parameter value is based on angular sector information provided by a sensor assembly configured to sense a plurality of rotor angular sectors, and further wherein the assigning of the parameter value comprises assigning a rotor position angle corresponding to one of the edges of the respective angular sector sensed by the sensor assembly;

energizing the machine with a level of current being sufficiently high to start rotor motion in a desired direction in the event the initial rotor position estimate is sufficiently close to the actual rotor position of the machine;

sensing whether any incremental changes in rotor position occurs in response to the energizing action;

in the event no changes in rotor position are sensed, incrementally adjusting the estimated rotor position by a first set of angular values until changes in rotor position are sensed;

in the event changes in rotor position are sensed, providing a rotor alignment signal as rotor motion continues; and aligning the estimated rotor position relative to the actual rotor position based on the alignment signal.

2. The method of claim 1 wherein the assigned parameter value for a present start of the machine comprises a rotor position angle retrieved from memory, the retrieved value corresponding to a last value calculated for rotor position angle prior to the present start of the machine.

3. The method of claim 1 wherein the assigned parameter value comprises an arbitrary rotor position angle.

4. The method of claim 1 wherein the sensing action further comprises sensing whether the rotor position changes occur in the desired direction of rotation.

5. The method of claim 1 wherein, in the event no changes in rotor position are sensed subsequent to incrementally adjusting the estimated rotor position by the first set of angular values, generating a fault indication signal.

6. A system for controlling the start of a permanent magnet machine, said system comprising:

a sensor assembly configured to sense a plurality of rotor angular sectors;

a parameter-assignment module configured to assign a parameter value indicative of an estimated initial rotor position of the machine, wherein the assigned parameter value is based on angular sector information provided by the sensor assembly, and further wherein the parameter-assignment module is further configured to assign a rotor position angle corresponding to one of the edges of the respective angular sector sensed by the sensor assembly;

an energization module configured to energize the machine with a level of current being sufficiently high to start rotor motion in a desired direction in the event the initial rotor position estimate is sufficiently close to the actual rotor position of the machine;

a sensor configured to sense whether any incremental changes in rotor position occurs in response to the energizing current; and a processor coupled to the incremental sensor to implement the following actions:

in the event no changes in rotor position are sensed, incrementally adjusting the estimated rotor position by a first set of angular values until changes in rotor position are sensed;

in the event changes in rotor position are sensed, processing a rotor alignment signal as rotor motion continues; and aligning the estimated rotor position relative to the actual rotor position based on the alignment signal.

7. The system of claim 5 wherein the assigned parameter value for a present start of the machine comprises a rotor position angle retrieved from memory, the retrieved value corresponding to a last value calculated for rotor position angle prior to the present start of the machine.

8. The system of claim 7 wherein the incremental sensor is further configured to sense whether the rotor position changes occur in the desired direction of rotation.

9. The system of claim 6 wherein the assigned parameter value comprises an arbitrary rotor position angle.

10. The system of claim 6 wherein, in the event no changes in rotor position are sensed subsequent to incrementally adjusting the estimated rotor position by the first set of angular values, generating a fault indication signal.

11. A method for controlling the start of a permanent magnet machine, said method comprising:

assigning a parameter value indicative of an estimated initial rotor position of the machine wherein the assigned parameter value is based on angular sector information provided by a sensor assembly configured to sense a plurality of rotor angular sectors, and further wherein the assigning of the parameter value comprises assigning a rotor position angle generally intermediate relative to the edges of the respective angular sector sensed by the sensor assembly;

energizing the machine with a level of current being sufficiently high to start rotor motion in a desired direction in the event the initial rotor position estimate is sufficiently close to the actual rotor position of the machine;

sensing whether any incremental changes in rotor position occurs in response to the energizing action;

in the event no changes in rotor position are sensed, incrementally adjusting the estimated rotor position by a first set of angular values until changes in rotor position are sensed;

in the event changes in rotor position are sensed, providing a rotor alignment signal as rotor motion continues; and aligning the estimated rotor position relative to the actual rotor position based on the alignment signal.

12. A method for controlling the start of a permanent magnet machine, said method comprising:

assigning a parameter value indicative of an estimated initial rotor position of the machine wherein the assigned parameter value is based on angular sector information provided by a sensor assembly configured to sense a plurality of rotor angular sectors, and further wherein the sensor assembly comprises at least one sensor selected from the group comprising Hall-effect, magneto-resistive, and optical sensors, and further wherein the assigning of the parameter value comprises assigning a rotor position angle corresponding to one of the edges of the respective angular sector sensed by the sensor assembly;

energizing the machine with a level of current being sufficiently high to start rotor motion in a desired direction in the event the initial rotor position estimate is sufficiently close to the actual rotor position of the machine;

sensing whether any incremental changes in rotor position occurs in response to the energizing action;

in the event no changes in rotor position are sensed, incrementally adjusting the estimated rotor position by a first set of angular values until changes in rotor position are sensed;

in the event changes in rotor position are sensed, providing a rotor alignment signal as rotor motion continues; and aligning the estimated rotor position relative to the actual rotor position based on the alignment signal.

13. A method for controlling the start of a permanent magnet machine, said method comprising:

assigning a parameter value indicative of an estimated initial rotor position of the machine wherein the assigned parameter value for a present start of the machine comprises a rotor position angle retrieved from memory, the retrieved value corresponding to a last value calculated for rotor position angle prior to the present start of the machine;

energizing the machine with a level of current being sufficiently high to start rotor motion in a desired direction in the event the initial rotor position estimate is sufficiently close to the actual rotor position of the machine;

sensing whether any incremental changes in rotor position occurs in response to the energizing action;

in the event no changes in rotor position are sensed, incrementally adjusting the estimated rotor position by a first set of angular values until changes in rotor position are sensed;

in the event changes in rotor position are sensed, providing a rotor alignment signal as rotor motion continues wherein the sensing action further comprises sensing whether the rotor position changes occur in the desired direction of rotation, and further wherein, in the event rotor position changes occur opposite to the desired direction of rotation, the incrementally adjusting action comprises incrementally adjusting the estimated rotor position by a second set of angular values until changes in rotor position in the desired direction are sensed; and aligning the estimated rotor position relative to the actual rotor position based on the alignment signal.

14. A system for controlling the start of a permanent magnet machine, said system comprising:

a sensor assembly configured to sense a plurality of rotor angular sectors;

a parameter-assignment module configured to assign a parameter value indicative of an estimated initial rotor position of the machine wherein the assigned parameter value is based on angular sector information provided by the sensor assembly, and further wherein the parameter-assignment module is further configured to assign a rotor position angle generally intermediate relative to the edges of the respective angular sector sensed by the sensor assembly;

an energization module configured to energize the machine with a level of current being sufficiently high to start rotor motion in a desired direction in the event the initial rotor position estimate is sufficiently close to the actual rotor position of the machine;

a sensor configured to sense whether any incremental changes in rotor position occurs in response to the energizing current; and a processor coupled to the incremental sensor to implement the following actions:
   in the event no changes in rotor position are sensed, incrementally adjusting the estimated rotor position by a first set of angular values until changes in rotor position are sensed;
   in the event changes in rotor position are sensed, processing a rotor alignment signal as rotor motion continues; and
   aligning the estimated rotor position relative to the actual rotor position based on the alignment signal.

15. A system for controlling the start of a permanent magnet machine, said system comprising:

a sensor assembly configured to sense a plurality of rotor angular sectors wherein the sensor assembly comprises at least one sensor configured to sense the plurality of rotor angular sectors selected from the group comprising Hall-effect, magneto-resistive, and optical sensors;

a parameter-assignment module configured to assign a parameter value indicative of an estimated initial rotor position of the machine wherein the assigned parameter value is based on angular sector information provided by the sensor assembly, and further wherein the parameter-assignment module is further configured to assign a rotor position angle corresponding to one of the edges of the respective angular sector sensed by the sensor assembly;

an energization module configured to energize the machine with a level of current being sufficiently high to start rotor motion in a desired direction in the event the initial rotor position estimate is sufficiently close to the actual rotor position of the machine;

a sensor configured to sense whether any incremental changes in rotor position occurs in response to the energizing current; and a processor coupled to the incremental sensor to implement the following actions:
   in the event no changes in rotor position are sensed, incrementally adjusting the estimated rotor position by a first set of angular values until changes in rotor position are sensed;
   in the event changes in rotor position are sensed, processing a rotor alignment signal as rotor motion continues; and
   aligning the estimated rotor position relative to the actual rotor position based on the alignment signal.

16. A system for controlling the start of a permanent magnet machine, said system comprising:

a parameter-assignment module configured to assign a parameter value indicative of an estimated initial rotor position of the machine wherein the assigned parameter value for a present start of the machine comprises a rotor position angle retrieved from memory, the retrieved value corresponding to a last value calculated for rotor position angle prior to the present start of the machine;

an energization module configured to energize the machine with a level of current being sufficiently high to start rotor motion in a desired direction in the event the initial rotor position estimate is sufficiently close to the actual rotor position of the machine;

a sensor configured to sense whether any incremental changes in rotor position occurs in response to the energizing current, wherein the incremental sensor is further configured to sense whether the rotor position changes occur in the desired direction of rotation; and a processor coupled to the incremental sensor to implement the following actions:
   in the event no changes in rotor position are sensed, incrementally adjusting the estimated rotor position by a first set of angular values until changes in rotor position are sensed;
   in the event changes in rotor position are sensed, processing a rotor alignment signal as rotor motion continues;
   in the event rotor position changes occur opposite to the desired direction of rotation, the incrementally adjusting action comprises incrementally adjusting the estimated rotor position by a second set of angular values until changes in rotor position in the desired direction are sensed; and
   aligning the estimated rotor position relative to the actual rotor position based on the alignment signal.

* * * * *